United States Patent
Cook

(10) Patent No.: US 9,760,873 B1
(45) Date of Patent: Sep. 12, 2017

(54) DISPLAYING PAYMENT CARD ACCOUNT INFORMATION

(75) Inventor: Fred S. Cook, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 3432 days.

(21) Appl. No.: 10/307,867

(22) Filed: Dec. 2, 2002

(51) Int. Cl.
  *G06Q 40/00* (2012.01)
  *G06Q 20/10* (2012.01)

(52) U.S. Cl.
  CPC .......... *G06Q 20/105* (2013.01); *G06Q 20/10* (2013.01)

(58) Field of Classification Search
  USPC ........................ 235/380; 705/34, 43, 41, 35
  See application file for complete search history.

(56) References Cited

U.S. PATENT DOCUMENTS

| | | | | |
|---|---|---|---|---|
| 3,665,162 A * | 5/1972 | Yamamoto et al. | ......... | 235/380 |
| 3,761,683 A * | 9/1973 | Rogers | ......... | 340/5.25 |
| 3,794,813 A * | 2/1974 | Spetz | ......... | 235/382 |
| 3,862,716 A * | 1/1975 | Black et al. | ......... | 235/381 |
| 4,016,405 A * | 4/1977 | McCune et al. | ......... | 235/380 |
| 4,415,065 A * | 11/1983 | Sandstedt | ......... | 705/34 |
| 4,802,218 A * | 1/1989 | Wright et al. | ......... | 705/60 |
| 5,202,825 A * | 4/1993 | Miller et al. | ......... | 705/21 |
| 5,386,106 A * | 1/1995 | Kumar | ......... | 235/380 |
| 5,387,784 A * | 2/1995 | Sarradin | ......... | 235/380 |
| 5,561,282 A * | 10/1996 | Price et al. | ......... | 235/380 |
| 5,850,077 A * | 12/1998 | Tognazzini | ......... | 235/380 |
| 5,857,156 A | 1/1999 | Anderson | | |
| 5,991,601 A | 11/1999 | Anderson | | |
| 6,003,762 A * | 12/1999 | Hayashida | ......... | 235/379 |
| 6,315,195 B1 * | 11/2001 | Ramachandran | ......... | 235/380 |
| 6,386,591 B1 * | 5/2002 | Blank | ......... | 283/75 |
| 6,749,111 B2 * | 6/2004 | Graef et al. | ......... | 235/379 |
| 6,786,420 B1 * | 9/2004 | Silverbrook | ......... | 235/494 |
| 6,839,688 B2 * | 1/2005 | Drummond et al. | ......... | 705/43 |
| 7,493,283 B1 * | 2/2009 | Philyaw | ......... | 705/39 |
| 2003/0230630 A1 * | 12/2003 | Whipple et al. | ......... | 235/462.01 |
| 2004/0099730 A1 * | 5/2004 | Tuchler et al. | ......... | 235/380 |

* cited by examiner

*Primary Examiner* — Jamie Austin

(57) ABSTRACT

A payment card information system according to one embodiment of the invention includes a card reader that scans a payment card and a display device that displays account information items. The payment card information system further includes an information terminal in communication with the card reader and the display device. The information terminal is configured to receive verification data from the card reader, verify the payment card using the verification data, receive an action code from the card reader, obtain one or more predetermined account information items corresponding to the action code, and display the one or more predetermined account information items on the display device.

19 Claims, 3 Drawing Sheets

DISPLAYING PAYMENT CARD ACCOUNT INFORMATION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of payment cards, and in particular, to systems and methods for displaying payment card account information.

2. Description of the Prior Art

Many types of payment cards exist, such as prepaid usage cards (one example is a prepaid phone card), credit cards, debit cards, etc. A payment card stores various items of information, including, for example, an account number, a holder identifier, and an issuer identifier, among other things. This information may be employed in order to conduct a transaction and transfer a payment amount.

Information on a payment card is stored magnetically in the form of a magnetic stripe layered on the back of the card. A magnetic reader can read the encoded information. Alternatively, the information is stored in the form of a bar code, where an optical reader reads the encoded information.

In use, a reader device scans the information stored on the card and uses this information to conduct a transaction, which usually entails a payment for goods or services. Therefore, the payment card usually has certain information associated with it, such as a card balance amount and/or a card limit amount. Consequently, when the payment card is used, the electronic device conducting the transaction verifies the authenticity of the card, verifies the card balance associated with the card, determines if the current transaction falls within the card limit, and then conducts a financial transaction that subtracts from the balance.

A drawback of the prior art is that the user likely does not know the account information associated with the payment card. In the case of a prepaid phone card, for example, the user may not know how much prepaid calling time is left on the card without using the card. For a credit or debit card, the user may not know the card balance and the card limit. In order to track or determine the account information, the user will generally have to use the payment card in order to obtain account information or will have to mentally track the values. Mentally tracking the account information may be difficult, especially if the payment card is infrequently used. Neither of these approaches is satisfactory.

SUMMARY OF THE INVENTION

The invention helps solve the above problems and provides a system and method for displaying payment card account information. A payment card information system according to one embodiment of the invention comprises a card reader capable of scanning a payment card and a display device that displays account information items. The payment card information system further comprises an information terminal in communication with the card reader and the display device. The information terminal is configured to receive verification data from the payment card through the card reader, receive an action code from the payment card through the card reader, verify the payment card using the verification data, obtain one or more predetermined account information items corresponding to the action code, and display the one or more predetermined account information items on the display device.

A method for displaying payment card information comprises the steps of reading verification data from a payment card, reading an action code from the payment card, verifying the payment card using the verification data, obtaining one or more predetermined account information items corresponding to the action code, and displaying the one or more predetermined account information items.

A software product for a payment card information display comprises control software configured when executed by a processing system to direct the processing system to read verification data from a payment card, read an action code from the payment card, verify the payment card using the verification data, obtain one or more predetermined account information items corresponding to the action code, and display the one or more predetermined account information items. The software product further comprises a storage system that stores the control software.

BRIEF DESCRIPTION OF THE DRAWINGS

The same reference number represents the same element on all drawings.

DETAILED DESCRIPTION OF THE PREFERRED EMBODIMENT

Figure 1:
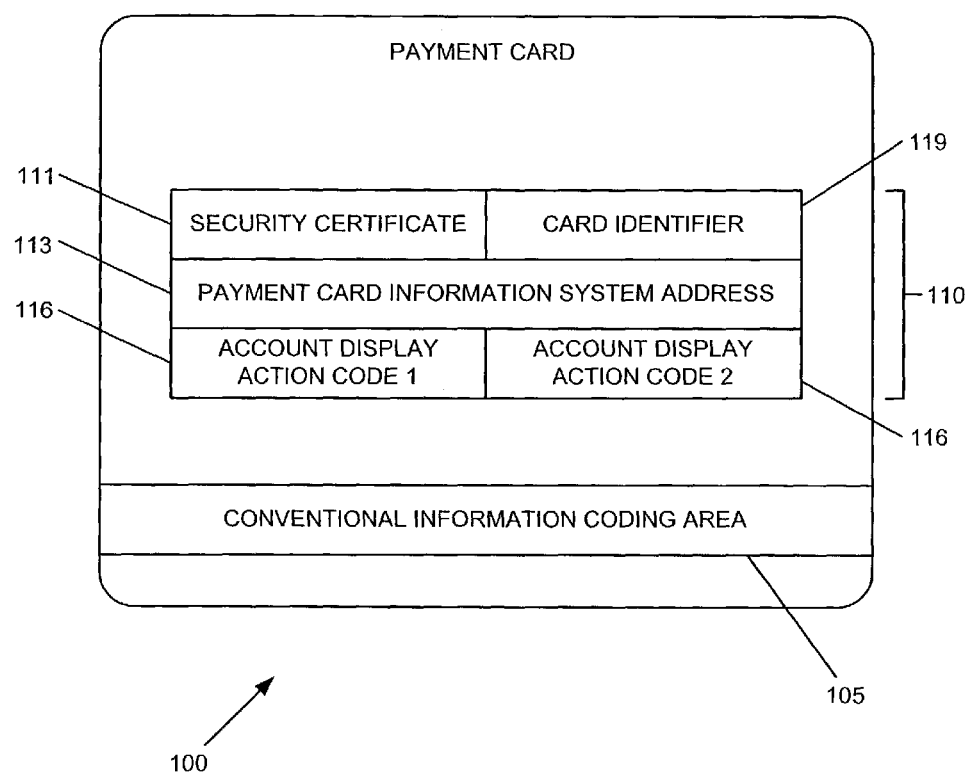
FIG. 1 is a block diagram of a payment card according to one embodiment of the invention.
Figure 2:
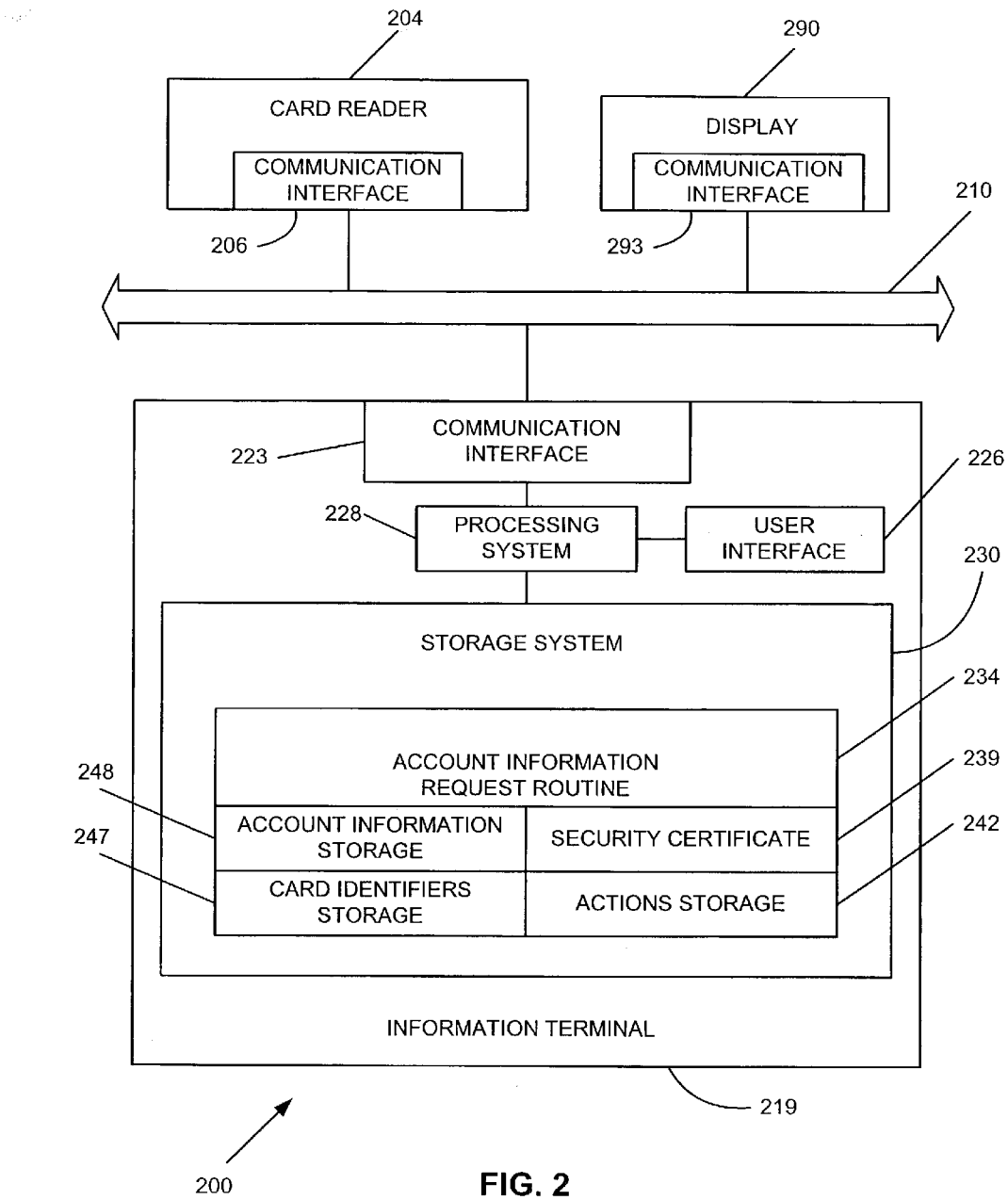
FIG. 2 is a block diagram of a payment card information system according to another embodiment of the invention.
Figure 3:
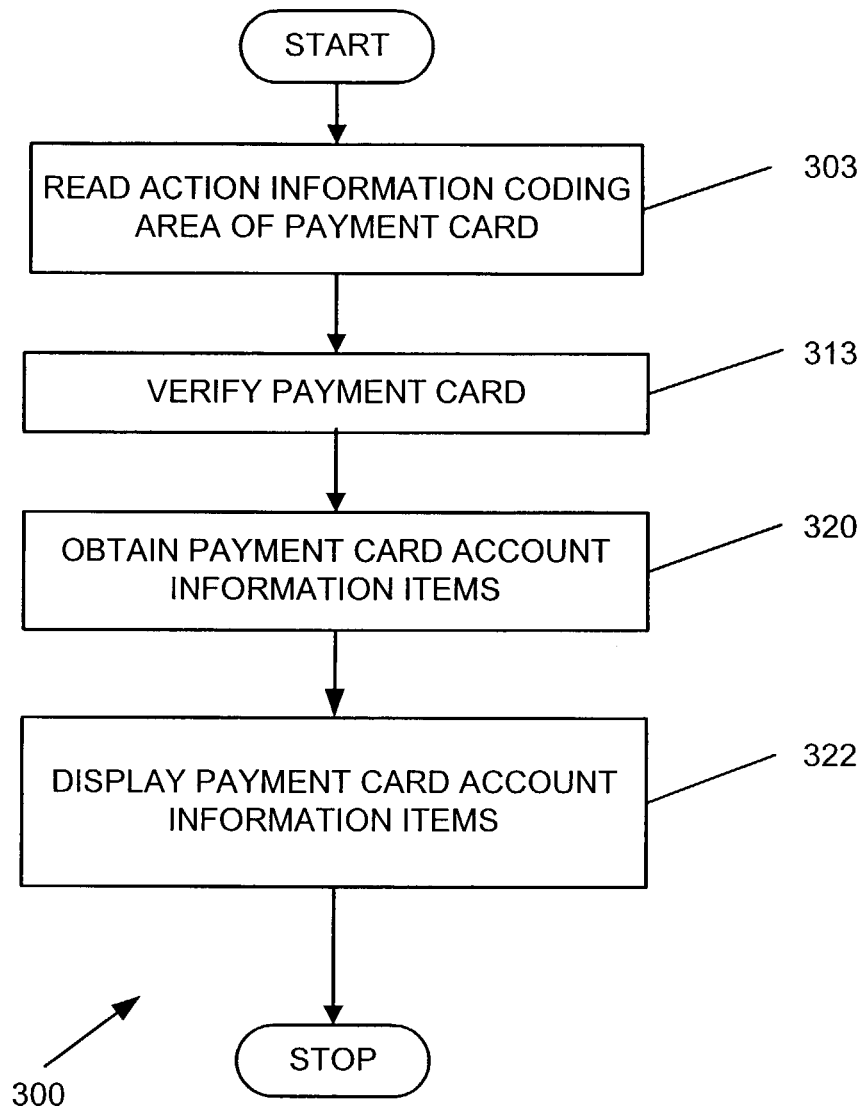
FIG. 3 is a flow chart of a payment card information display method according to another embodiment of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 is a block diagram of a payment card 100 according to one embodiment of the invention. The payment card 100 includes a conventional information coding area 105 and an action information coding area 110. Some examples of the conventional information coding area 105 are an encoded magnetic stripe, a bar code, embossed information, etc. The conventional information coding area 105 may include, for example, a card holder identifier, a card issuer identifier, and an account number.

The action information coding area 110 is scanned in order to read an action that enables the display of account information items. In one embodiment, the action information coding area data is encoded in a known manner. In some embodiments, the action information coding area 110 includes verification data (such as a security certificate 111 and a card identifier 119, for example), a payment card information system address 113, and one or more action codes 116.

In one embodiment, the action information coding area 110 is formed as a discrete area of the payment card 100, as shown. Alternatively, in another embodiment the action information coding area 110 comprises information included in the conventional information coding area 105. In another alternative embodiment, the information items of the action information coding area 110 are distributed across the payment card 100, including on the opposite side of the card from the conventional information coding area 105.

The action information coding area 110 may comprise machine-readable information, including a bar code, a magnetic stripe, an embossed information area, etc. The action information coding area 110 may be formed as part of the payment card 100, including one or more layers of ink, dye, reflective or translucent material, magnetic material, etc., formed into and as part of the payment card 100. Alternatively, the action information coding area 110 may be separately created and permanently or removably attached to the payment card 100, such as a film or sticker that is attached to the payment card 100 by electrostatic force, by an adhesive, etc. Another mechanism for grouping the data is through a clear plastic sleeve, wherein the action information coding area 110 is printed, adhered, embossed, etc. to the clear plastic sleeve. The payment card 100 can be inserted into the sleeve. In this manner, a pre-existing payment card may be modified to operate according to the invention.

The security certificate 111 is a digital security certificate generated or obtained from the card issuer or by a trusted certifier. The security certificate 111 is used by a card reader device to authenticate the payment card 100.

The card identifier 119 is a unique identifier that identifies the particular payment card. The card identifier 119 may be in addition to a card identifier contained in the conventional information coding area 105, such as the account number. For reasons of security, the card identifier 119 is not an account number and an account number is not transmitted in order to obtain the action information coding area data.

The payment card information system address 113 identifies a predetermined destination for the action information coding area data, such as a payment card information system 200 (see FIG. 2 and accompanying discussion). The payment card information system address 113 may route the action information coding area data to such a payment card information system for processing. In one embodiment, the payment card information system address 113 is a computer network address. For example, the payment card information system address 113 may be a web address that directs the action information coding area data to a website that acts on and processes the action information coding area data.

The one or more action codes 116 are any marking or indicia that indicate encoded account display actions to be taken as a result of reading/scanning the action information coding area 110. Multiple action codes 116 may be included on the payment card 100. The action codes may be selected and programmed by the user of the payment card 200, or may be programmed by the issuing institution. An action code 116 may specify, for example, that the card balance is to be displayed, that the card limit is to be displayed, that a predetermined number of (or all) account transactions are to be displayed, etc.

In use, the user/cardholder causes the payment card 100 to be scanned. As a result, both the conventional information coding area 105 and the action information coding area 110 are read. The included payment card information system address 113 is used to determine where the scanned action information coding area data is to be sent. In one embodiment, the card reader may send the action information coding area data to a payment card information system 200 (see FIG. 2 and accompanying discussion). The payment card information system 200 verifies the authenticity of the payment card 100 using the verification data (such as the security certificate 111 and the card identifier 119). For security purposes, the account number (contained in the conventional information coding area 105) is not used. Therefore, no sensitive information is employed and there is no security risk associated with obtaining account information (i.e., an account number is not transmitted over a communication network). At the above step, the process may stop if the verification fails, such as if the card is stolen and/or has been invalidated by the issuing institution. The payment card information system 200 receives one or more action codes 116 and performs the requested account display actions, such as, for example, displaying a card balance. The payment card 100 therefore is capable of performing a simple, straightforward account information display action for the user.

FIG. 2 is a block diagram of a payment card information system 200 according to another embodiment of the invention. The payment card information system 200 includes a card reader 204, a display device 290, and an information terminal 219.

It should be understood that although the payment card information system 200 is shown as various components, it may be configured in various ways. The payment card information system 200 may be components of a common device, such as a computer workstation, a payment card processing system, a public payment card terminal, or a kiosk. For example, a public access web terminal may include a magnetic or optical reader that cooperates with a payment card information system central site (i.e., communicates with at least one payment card information system 200), and the central site may receive the information and display account information to the user. The displaying operation may include transmitting display data to the user at the public access web terminal. Alternatively, if the user possesses a computer, payment card information system software, and an appropriate reader (such as a bar code reader, for example), the user may monitor account information from the privacy of his or her own home.

In an alternative embodiment, the payment card information system 200 may further include a communication network 210, and therefore the components may be remotely located. The communication network 210 may be any type of communication medium, including a computer network, such as a local area network (LAN), a wide-area network (WAN), the Internet, a landline telephone network, a wireless network such as a radio network or a cellular or satellite telephone network, etc. The communication network 210 may interconnect the various components discussed above and conducts communications between them. For example, the card reader 204, the information terminal 219, and the display device 209 may be separate devices that communicate over the Internet. In one embodiment, the card reader 204 and the display device 209 are components of a home computer system that communicates with the information terminal 219. Furthermore, the payment card information system 200 may communicate with a remotely located payment card processing center (not shown) in order to obtain account information items. The payment card processing center may be a processing center that performs account transactions, for example, such as a credit card processing center.

The card reader 204 is any device configured to scan the payment card 100 and read the account information coding area data included in the account information coding area 110. The card reader 204 may be a magnetic or optical reader. Alternatively, the card information reader 204 may be a surface topography scanner that scans the surface of the payment card 100 and reads data embossed thereon. It should be understood that the card reader 204 may be any known type of data reader device. In one embodiment, the card reader 204 is a CUECAT barcode reader available from DigitalConvergence Corporation.

In some embodiments, the card reader 204 includes a communication interface 206 that is capable of communicating over the communication network 210. For example, the communication interface 206 may be a modem, a digital computer network card, a wireless modem, a radio-frequency (RF) transceiver, an optical fiber transceiver, etc. The card reader 204 therefore may communicate the action information coding area data to the information terminal 219.

The information terminal 219 includes a processing system 228, a user interface 226, and a storage system 230. The processing system 228 is linked to the communication interface 223, the storage system 230, and the user interface 226. The payment card information system 220 may additionally include a communication interface 223. The communication interface 223 may be similar to the communication interface 206 in the card reader 204.

The processing system 228 executes a control routine contained in the storage system 230. In addition, the processing system 228 receives inputs and conducts operations of the payment card information system 200, including conducting communications with external devices, receiving user inputs from the user interface 226, and generating a display of account information items.

The processing system 228 may be a general purpose processing system. The processing system 228 may comprise a programmed general purpose computer or a microprocessor. Alternatively, the processing system 228 may comprise a logic circuit or other programmable or special purpose circuitry and equipment.

The user interface 226 may accept user inputs and may further generate outputs and displays to the user, including printed outputs. In one embodiment, the user interface 226 comprises an input device, such as a keyboard, mouse, pointing device, menu, voice recognition interface, etc. In another embodiment, the user interface 226 comprises an input/output device, including a display, a touchscreen, a keyboard, mouse, pointing device, menu, voice recognition interface, etc., and combinations thereof.

The storage system 230 is a digital storage system. The storage system 230 may store, among other things, an account information request routine 234, a security certificate 239, an actions storage 242, an account information storage 248, and a card identifiers storage 247. In addition, the storage system 230 may store software or firmware to be executed by the processing system 228.

The account information request routine 234, when executing on the processing system 228, receives the security certificate 111, the card identifier 119, and the action codes 116 stored within the action information coding area 110. The account information request routine 234 verifies the payment card 100 by comparing the received security certificate and received card identifier to verification data stored in the storage system 230. If the verification process is successful, the account information request routine 234 may then process the action codes 116 and use them to obtain account information items. For example, the action codes 116 may be translated into formatted payment card account information item requests that specify account information items. The requests may be transmitted to an account information repository that is capable of supplying the requested account information items. The account information repository may be a payment card processing center, for example, and may be co-located with the payment card information system 200 or may be remotely located.

The translation may be performed by a storage lookup, wherein an action code is used as a unique input that produces a unique output, such as a formatted payment card account information item request output, for example. The translation therefore comprises matching an action code 116 included in the action information coding area 110 with an action code stored in the information terminal 219, with the action code specifying a predetermined account information item. The formatted payment card account information item request may additionally include account and/or security information that allows the payment card information system 200 to access a source of account information (i.e., the account information repository). The account information request routine 234 therefore obtains the account information items corresponding to the action codes 116 of the account information coding area 110, in conjunction with other data stored in the storage system 230.

The account information request routine 234 further displays the account information items to the user. This may include acting upon multiple action codes and displaying multiple account information items. In addition, the account information request routine 234 may transmit the account information items to the display device 290 if the display device 290 is remotely located. Alternatively, the account information items can be wirelessly transmitted to a hand-held electronic device, such as a personal digital assistant (PDA) for display. This may be preferred over display on a public terminal such as an ATM, for example.

The security certificate 239 is preferably obtained from a trusted security certificate issuing institution. Therefore, the security certificate 111 of the payment card 100 matches this master security certificate 239 for the payment card 100 to be valid.

The actions storage 242 stores all possible account display actions, wherein the actions storage 242 is used to translate an action code 116 into a desired payment card account information item. The actions storage 242 may include actions such as a card balance reporting action, a card limit reporting action, an account transactions reporting action, an account transactions occurring within a predetermined number of days reporting action, etc.

The account information storage 248 may temporarily or permanently store all account information items received by the information terminal 219. The account information items may be obtained from an appropriate payment card processing center, and may be temporarily stored until a current display session ends.

The card identifiers storage 247 stores card identifiers 119 of all valid payment cards 100. Therefore, during an authorization process, the card identifier 119 of a particular payment card 100 matches a card identifier stored within the card identifiers storage 247.

The display device 290 displays the obtained account information items to the user. The display device 290 is a device (or device component) that is capable of displaying data, including a personal computer and associated monitor, a network workstation and associated monitor, a point of sale terminal, a public kiosk, a PDA or other handheld electronic device, etc. The display device 290 may include a communication interface 293, similar to those in the card reader 204 and the information terminal 219.

FIG. 3 is a flow chart 300 of a payment card information display method according to another embodiment of the invention. In step 303, the payment card information system 200 scans the payment card 100 and therefore reads the account information coding area data stored within the action information coding area 110. In one embodiment, this step may include the card reader 204 reading and transmitting the account information coding area data to the information terminal 219.

In step 313, the payment card information system 220 verifies the payment card 100. This may include comparing the security certificate 111 of the payment card 100 to an official security certificate stored within the payment card information system 220. This may further include comparing the card identifier 119 of the payment card 100 to all valid payment card identifiers stored within the payment card information system 220.

In step 320, the payment card information system 200 obtains account information items corresponding to the action codes 116 included in the account information coding area data. This step may include requesting and receiving the account information items from a remote source, such as from a payment card processing center.

In step 322, the payment card information system 220 displays the account information items to the user. This may include transmitting the account information items from the information terminal 219 to the display device 209, where it is displayed to the user.

The payment card information system according to the invention may be used in any payment card system, and includes prepaid usage cards, credit cards, and debit cards, for example.

The invention differs from the prior art in that in the prior art the user reviews a transcript of payments or performs a transaction with the payment card in order to obtain account information. The invention therefore advantageously provides a system and method for independently, easily, and quickly obtaining and displaying payment card account information. Moreover, the invention provides the payment card account information in a secure manner without need for transmitting an account number over a communication medium.

What is claimed is:

1. A payment card information system for scanning a payment card provided by a user, comprising:
a card reader capable of scanning a conventional information coding area on the payment card to obtain an account number stored in the conventional information coding area that identifies an account held by the user and an action information coding area on the payment card to obtain action information coding area data stored in the action information coding area comprising an action code and an information system address, wherein the action information coding area is separate from the conventional information coding area and the information system address identifies a remotely located payment card processing center; and
an information terminal in communication with the card reader, wherein the information terminal comprises a non-transitory storage system configured to receive and store the action code and the information system address from the payment card through the card reader, the information terminal further comprising a processing system in communication with the non-transitory storage system configured to translate the action code into a payment card account information item request, and obtain one or more account information items from the remotely located payment card processing center without using the account number, wherein the account information items are determined by the user to correspond to the action code.

2. The system of claim 1, further comprising a display device in communication with the card reader and with the information terminal, wherein the display device is configured to display the one or more account information items.

3. The system of claim 2, wherein the information terminal, the display device, and the card reader include corresponding communication interfaces, and the information terminal, the display device, and the card reader communicate over a communication network.

4. The system of claim 1, wherein the action information coding area data further comprises verification data, and wherein the information terminal is further configured to receive the verification data from the payment card through the card reader and verify the payment card using the verification data.

5. The system of claim 1, wherein the card reader comprises one or more of a magnetic data reader, an optical data reader, and a surface topography data reader.

6. The system of claim 1, wherein the information terminal further comprises:
the non-transitory storage system storing:
an account information request routine that receives the action information coding area data and obtains the payment card action information items from the remotely located payment card processing center using the payment card account information item request;
an actions storage that stores the action code that can be performed by the payment card information system, with the actions storage translating the action code into the payment card account information item request;
a card identifiers storage that stores payment card identifiers of all payment cards authorized to use the payment card information system; and
a security certificate.

7. The system of claim 6, wherein the storage system further includes an account information storage that stores the one or more account information items obtained by the information terminal.

8. A method for displaying payment card information, the method comprising the steps of:
in a card reader device, reading a conventional information coding area on the payment card to obtain an account number stored in the conventional information coding area that identifies an account held by the user;
in the card reader device, reading an action information coding area on the payment card to obtain action information coding area data stored in the action information coding area comprising an action code and an information system address, wherein the action information coding area is separate from the conventional information coding area and the information system address identifies a remotely located payment card processing center;

in an information terminal in communication with the card reader, translating the action code into a payment card account information item request, in the information terminal, obtaining one or more account information items from the remotely located payment card processing center without using the account number, wherein the account information items are determined by the user to correspond to the action code; and in the information terminal, displaying the one or more account information items.

9. The method of claim 8, further comprising:

reading verification data from a payment card provided by a user, wherein the reading is performed in a card reader device;

transmitting the verification data from the card reader device to an information terminal; and verifying the payment card using verification data, wherein the action information coding area data further comprises the verification data.

10. The method of claim 8, further comprising transmitting the one or more account information items to a display device, and wherein displaying the one or more account information items is performed in the display device.

11. The method of claim 9, wherein verifying the payment card using verification data further comprises:

comparing a first security certificate included in an action information coding area to a second security certificate stored in an information terminal; and comparing a card identifier included in the action information coding area to a plurality of authorized payment card identifiers stored in the information terminal.

12. The method of claim 8, wherein the obtaining step further comprises translating the action code into a payment card account information item request that specifies the one or more payment card account information items.

13. The method of claim 12, wherein the one or more payment card account information items are obtained from the remotely located payment card processing center using the payment card account information item request.

14. A software product for a payment card information display, comprising:

control software configured when executed by a processing system to direct the processing system to read a conventional information coding area on the payment card to obtain an account number stored in the conventional information coding area that identifies an account held by the user, read an action information coding area on the payment card to obtain action information coding area data stored in the action information coding area comprising an action code and an information system address, wherein the action information coding area is separate from the conventional information coding area and the information system address identifies a remotely located payment card processing center, obtain one or more account information items from the remotely located payment card processing center without using the account number, wherein the account information items are determined by the user to correspond to the action code, and display the one or more account information items; and a non-transitory storage system that stores the control software.

15. The software product of claim 14, wherein the control software is further configured to direct the processing system to transmit the payment card action information from the card reader device to an information terminal.

16. The software product of claim 14, wherein the control software is further configured to direct the processing system to transmit the one or more account information items to a display device.

17. The software product of claim 14, wherein the control software is further configured to direct the processing system to:

compare a security certificate included in the action information coding area to a security certificate stored in an information terminal; and compare a card identifier included in the action information coding area to a plurality of authorized payment card identifiers stored in the information terminal.

18. The software product of claim 14, wherein the control software is further configured to direct the processing system to translate the action code into a payment card account information item request that specifies the one or more payment card account information items.

19. The software product of claim 18, wherein the control software is further configured to direct the processing system to obtain the one or more account information items from the remotely located payment card processing center using the payment card account information item request.

* * * * *